US012668972B1

(12) United States Patent
Lee

(10) Patent No.: US 12,668,972 B1
(45) Date of Patent: Jun. 30, 2026

(54) FIRE-PREVENTION BUILDING ROOF SYSTEM

(71) Applicant: Eungtaek Lee, Anaheim, CA (US)

(72) Inventor: Eungtaek Lee, Anaheim, CA (US)

( * ) Notice: Subject to any disclaimer, the term of this patent is extended or adjusted under 35 U.S.C. 154(b) by 0 days.

(21) Appl. No.: 19/347,728

(22) Filed: Oct. 2, 2025

Related U.S. Application Data

(63) Continuation of application No. 19/301,989, filed on Aug. 16, 2025.

(51) Int. Cl.
*E04D 1/30* (2006.01)
*A62C 3/02* (2006.01)

(52) U.S. Cl.
CPC .............. *E04D 1/30* (2013.01); *A62C 3/0214* (2013.01); *E04D 2001/308* (2013.01)

(58) Field of Classification Search
CPC ....... E04D 1/30; E04D 1/12; E04D 2001/308; E04D 13/00; A62C 3/0214
USPC ....................................... 52/518, 554, 173.1
See application file for complete search history.

(56) References Cited

U.S. PATENT DOCUMENTS 1,979,862 A * 11/1934 Cannon ..................... E04D 1/02 52/542
2,319,857 A * 5/1943 Gray ......................... E04D 3/24 52/311.2
5,293,727 A * 3/1994 Yoshimoto ............. E04D 1/265 52/554
9,410,323 B1 * 8/2016 Leitch ....................... E04D 1/12
2003/0172611 A1 * 9/2003 Coco ......................... E04D 1/26 52/554
2005/0210807 A1 * 9/2005 Martinique ............... E04D 1/34 52/518
2009/0100779 A1 * 4/2009 Cluthe ...................... E04D 1/30 52/543
2009/0151288 A1 * 6/2009 Kalkanoglu .............. B26F 1/12 52/554
2016/0340903 A1 * 11/2016 Folkersen ................. E04D 1/26
2018/0313088 A1 * 11/2018 Folkersen ................. E04D 1/30
2020/0023218 A1 * 1/2020 Reese, III .............. G01K 1/024
2022/0008767 A1 * 1/2022 Tran .......................... E04B 1/94
2022/0228370 A1 * 7/2022 Nguyen .................... E04D 1/26
2022/0325525 A1 * 10/2022 Shiao ........................ E04D 1/22
2023/0011075 A1 * 1/2023 Melnick .................... E04D 1/22
2023/0238913 A1 * 7/2023 Richards .................. E04D 1/26 52/173.3
2023/0340789 A1 * 10/2023 Norwood ........... E04F 13/0864

* cited by examiner

*Primary Examiner* — Paola Agudelo

(57) ABSTRACT

A fire-prevention building roof system according to an embodiment of the present disclosure includes a roof structural surface having a slope, at least one sprinkler installed at a ridge of the roof structural surface, and a plurality of roof tiles installed to cover the roof structural surface, wherein the plurality of roof tiles comprise a plurality of roof tile groups, wherein boundaries between the plurality of roof tiles of an upper roof tile group are offset from boundaries between the plurality of roof tiles of a lower roof tile group, and wherein each of the plurality of roof tiles comprises a water collecting guide step guiding water toward the center from the opposite side edges, and a water dispersing guide step guiding the water, which is collected toward the center by the water collecting guide step, toward the opposite side edges.

2 Claims, 8 Drawing Sheets

FIRE-PREVENTION BUILDING ROOF SYSTEM

TECHNICAL FIELD

The present invention relates generally to building roof structures, and more particularly, to a roof system configured to prevent the spread of fire by using sprinklers and specially shaped roof tiles capable of controlling water flow.

BACKGROUND OF THE INVENTION

In conventional building roof structures, when a fire occurs, water sprayed from external sources often becomes concentrated in certain areas of the roof, resulting in uneven distribution. This can lead to insufficient water coverage in some regions, particularly in areas experiencing water shortages or large-scale fires, thereby reducing fire suppression effectiveness and causing inefficient use of available firefighting water.

Although flame-retardant materials are sometimes used as roofing materials, water application remains essential during a fire, and it is critical to distribute that water evenly across the entire roof surface. Conventional systems, however, often fail to achieve such distribution, leaving some areas vulnerable to ignition and structural damage.

Furthermore, when a fire occurs near a building, sparks or burning embers can be carried by the wind and land on the roof, potentially igniting it. To prevent this, it is necessary to ensure the roof is uniformly wetted so that embers cannot easily ignite the surface. However, in situations where firefighting water is limited, indiscriminate spraying over the roof is not an effective solution.

SUMMARY OF THE INVENTION

The present invention provides a fire-prevention building roof system including: a roof structural surface having a slope on a building roof; at least one sprinkler installed at a ridge of the roof structural surface and configured to spray water; and a plurality of roof tiles installed to cover the roof structural surface. The plurality of roof tiles include a plurality of roof tile groups, a plurality of the roof tiles in each of the plurality of roof tile groups are arranged in a row in a transverse direction perpendicular to a slope direction of the roof structural surface, and the plurality of roof tile groups are arranged such that the plurality of roof tile groups are partially overlapped with each other in the slope direction. A portion in the slope direction of a lower surface of an upper roof tile group among two adjacent roof tile groups is in contact with a portion in a direction opposite to the slope direction of an upper surface of a lower roof tile group among the two adjacent roof tile groups. When viewed from above, boundaries between the plurality of roof tiles of the upper roof tile group are offset from boundaries between the plurality of roof tiles of the lower roof tile group. Each of the plurality of roof tiles includes: a water collecting guide step protruding to form a step configured to catch water flowing along the slope direction on an upper surface of the roof tile; and a water dispersing guide step spaced apart in the slope direction from the water collecting guide step and protruding to form a step configured to catch water flowing along the slope direction on the upper surface of the roof tile. The water collecting guide step includes a first water collecting guide step extending from a left end of the roof tile in a direction between the slope direction and a rightward direction, and a second water collecting guide step extending from a right end of the roof tile in a direction between the slope direction and a leftward direction, the first and second water collecting guide steps meeting each other at a center between opposite side edges of the upper surface to guide water toward the center from the opposite side edges. The water dispersing guide step comprises a first water dispersing guide step extending from the left end of the roof tile in a direction between a direction opposite to the slope direction and the rightward direction, and a second water dispersing guide step extending from the right end of the roof tile in a direction between the direction opposite to the slope direction and the leftward direction, the first and second water dispersing guide steps meeting each other at the center to guide the water, which is collected toward the center by the water collecting guide step, toward the opposite side edges. The roof tile overlaps with another roof tile at a position spaced in a direction opposite to the slope direction from the water collecting guide step, such that the water collecting guide step and the water dispersing guide step are exposed to the outside.

In one embodiment, when viewed from above, the water collecting guide step may have a V-shape convex in the slope direction at a center thereof, and the water dispersing guide step may have a V-shape convex in a direction opposite to the slope direction at a center thereof.

In one embodiment, the fire-prevention building roof system may further include a fire detection sensor configured to detect a fire around the building. The at least one sprinkler may include a plurality of sprinklers spaced apart from each other along the ridge of the building roof, the plurality of sprinklers being operatively connected to the fire detection sensor so as to automatically spray water onto the ridge upon occurrence of a fire around the building. The roof tiles may be formed of ceramic, metal, or a flame-retardant synthetic resin.

DETAILED DESCRIPTION OF EMBODIMENTS

Figure 1:
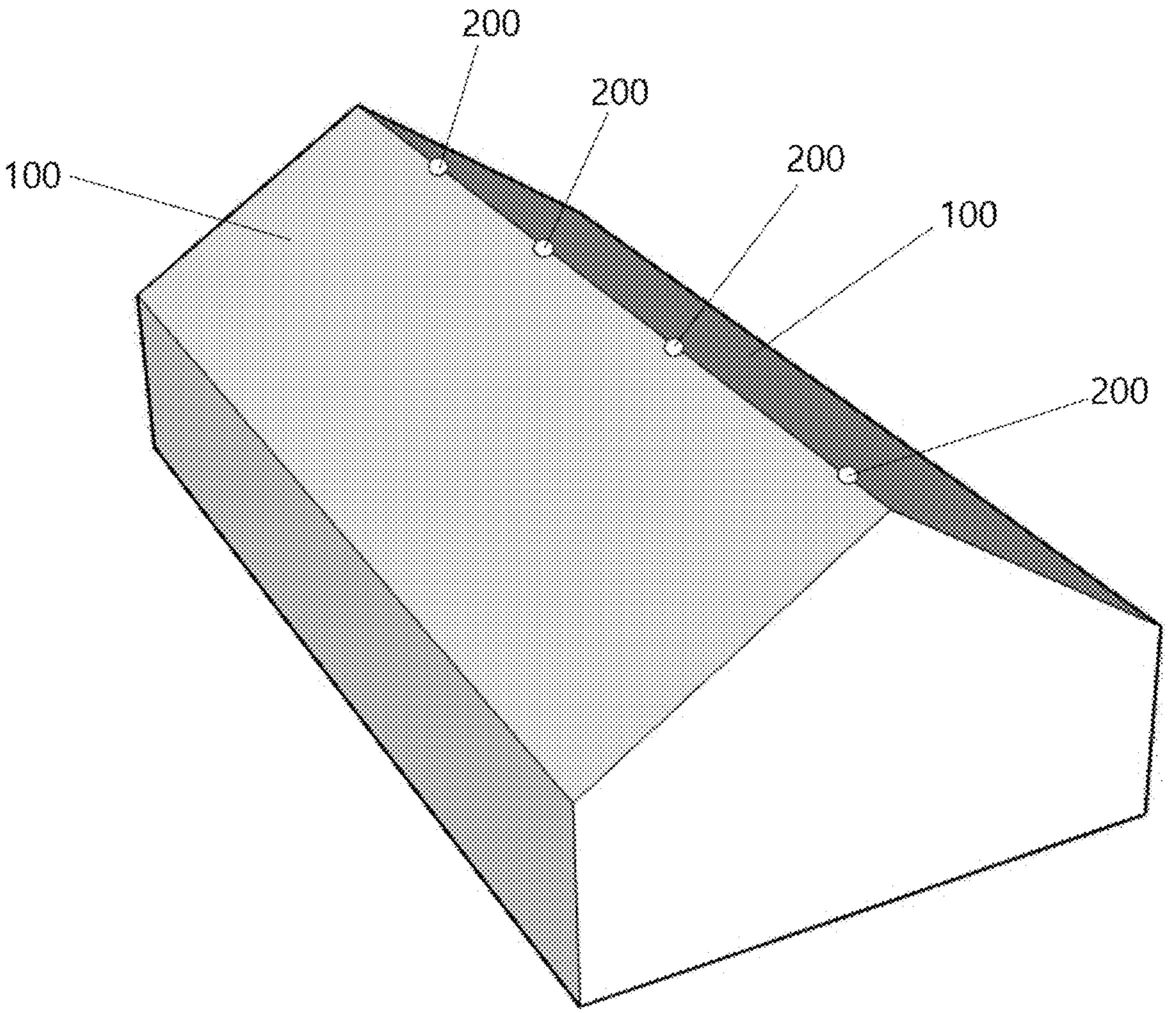
FIG. 1 is a perspective view of a roof structural surface of a building and at least one sprinkler installed along the ridge.

Hereinafter, embodiments will be described in detail with reference to the accompanying drawings. However, various modifications may be made to the embodiments, and the scope of rights of the present patent application is not limited or restricted by these embodiments. It should be understood that all modifications, equivalents, and alternatives with respect to the embodiments are included in the scope of rights.

Specific structural or functional descriptions of the embodiments are disclosed for illustrative purposes only, and may be modified and implemented in various forms. Therefore, the embodiments are not limited to a specific disclosure form, and the scope of the present specification includes modifications, equivalents, or alternatives included in the technical spirit.

It will be understood that, although the terms first, second, and the like may be used for describing various components, these terms should be interpreted only for the purpose of distinguishing one component from another. For example, a first component may be referred to as a second component, and a second component may also be referred to as a first component in a similar manner.

When a component is referred to as being "connected" to other components, the component may be directly connected or accessed to the other components, but it should be also understood that another component may be present therebetween.

The terms used in the embodiments are for descriptive purposes only, and should not be construed as limiting. Singular expressions include plural expressions unless the context clearly indicates otherwise. In the present specification, it should be understood that the terms "comprise", or "have" are intended to specify the presence of stated features, numbers, steps, operations, components, parts, or combinations thereof in the disclosure, but do not preclude the presence or addition of one or more other features, numbers, steps, operations, components, parts, or combinations thereof.

Unless otherwise defined, all the terms used herein, including technical or scientific terms, have the same meanings as those commonly understood by those skilled in the art to which the embodiments belong. Terms such as those defined in a dictionary commonly used should be construed as having meanings consistent with meanings in the context of the related art, and should not be construed as having ideal or overly formal meanings unless explicitly defined in the present application.

In addition, in describing the present invention with reference to the accompanying drawings, the same components will be given the same reference numerals irrespective of reference numerals, and redundant descriptions thereof will be omitted. In describing the embodiments, if it is determined that a detailed description of a related known technology may unnecessarily obscure the gist of the embodiments, the detailed description will be omitted.

Figure 2:
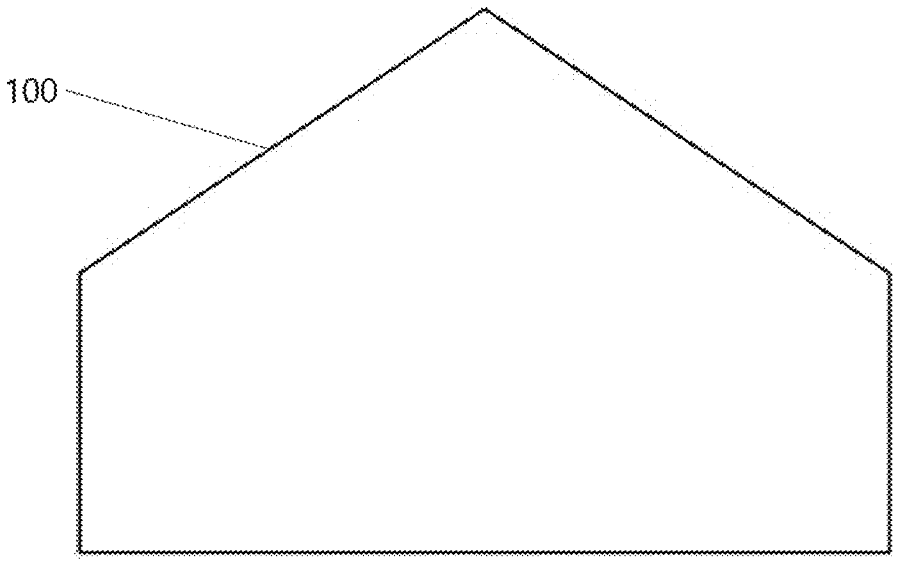
FIG. 2 is an elevation view of a building of FIG. 1.
Figure 3:
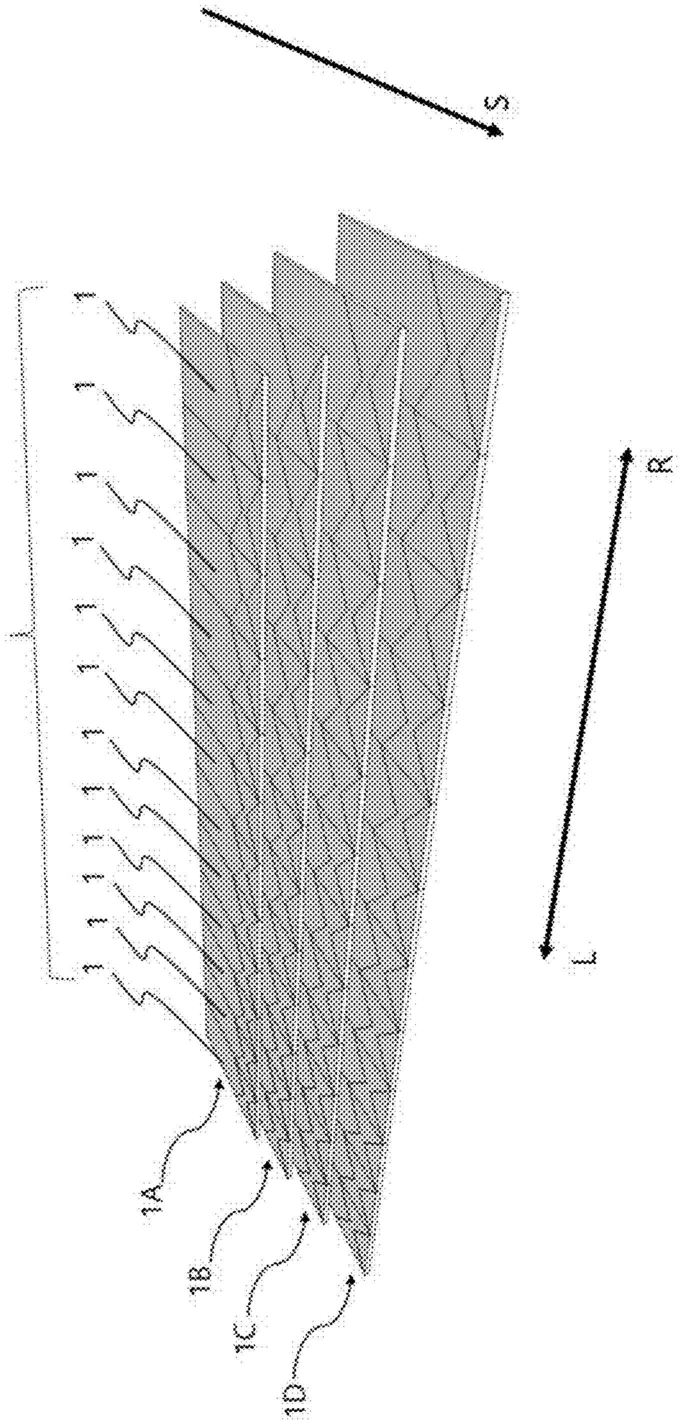
FIG. 3 is a perspective view of a plurality of roof tile groups arranged in overlapping fashion.

FIG. 1 is a perspective view of a roof structural surface of a building and at least one sprinkler installed along the ridge. FIG. 2 is an elevation view of a building of FIG. 1. FIG. 3 is a perspective view of a plurality of roof tile groups arranged in overlapping fashion.

Referring FIGS. 1 to 3, A fire-prevention building roof system according to an embodiment of this disclosure includes: a roof structural surface 100 having a slope on a building roof; at least one sprinkler 200 installed at a ridge of the roof structural surface 100 and configured to spray water; and a plurality of roof tiles 1 installed to cover the roof structural surface 100. The at least one sprinkler 200 includes a plurality of sprinklers 200 spaced apart from each other along the ridge of the building roof. Here, a downwardly sloping direction from the ridge of the building roof is defined as a slope direction S, and transverse directions L and R are defined as directions perpendicular to the slope direction S. The transverse directions L and R indicate, respectively, a leftward direction L and a rightward direction R.

The fire-prevention building roof system may further includes a fire detection sensor configured to detect a fire around the building. The plurality of sprinklers 200 are operatively connected to the fire detection sensor so as to automatically spray water onto the ridge upon occurrence of a fire around the building.

The plurality of roof tiles 1 may be fixed to the roof structural surface 100 by various known techniques. The plurality of roof tiles 1 may be arranged such that they partially overlap one another along the slope direction S. In a different embodiment, the plurality of roof tiles 1 may also be arranged such that they partially overlap one another along the transverse directions L and R.

Referring FIG. 3, The plurality of roof tiles 1 includes a plurality of roof tile groups 1A, 1B, 1C, and 1D. A plurality of the roof tiles 1 in each of the plurality of roof tile groups 1A, 1B, 1C, and 1D are arranged in a row in the transverse direction L and R perpendicular to the slope direction S of the roof structural surface 100. The plurality of roof tile groups 1A, 1B, 1C, and 1D are arranged such that the plurality of roof tile groups 1A, 1B, 1C, and 1D are partially overlapped with each other in the slope direction S. For example, a portion in the slope direction S of a lower surface of an upper roof tile group 1A among two adjacent roof tile groups 1A and 1B is in contact with a portion in a direction opposite to the slope direction S of an upper surface 115 of a lower roof tile group 1B among the two adjacent roof tile groups 1A and 1B. For example, a portion in the slope direction S of a lower surface of an upper roof tile group 1B among two adjacent roof tile groups 1B and 1C is in contact with a portion in a direction opposite to the slope direction S of an upper surface 115 of a lower roof tile group 1C among the two adjacent roof tile groups 1B and 1C. For example, a portion in the slope direction S of a lower surface of an upper roof tile group 1C among two adjacent roof tile groups 1C and 1D is in contact with a portion in a direction opposite to the slope direction S of an upper surface 115 of a lower roof tile group 1D among the two adjacent roof tile groups 1C and 1D.

When viewed from above, boundaries between the plurality of roof tiles 1 of the upper roof tile group (ex. 1A) are offset from boundaries between the plurality of roof tiles 1 of the lower roof tile group (ex. 1B). For example, boundaries between the plurality of roof tiles 1 of the upper roof tile group (e.g., 1A) may be located at a central portion of the upper surfaces 115 of the plurality of roof tiles 1 of the lower roof tile group (e.g., 1B).

Figure 4:
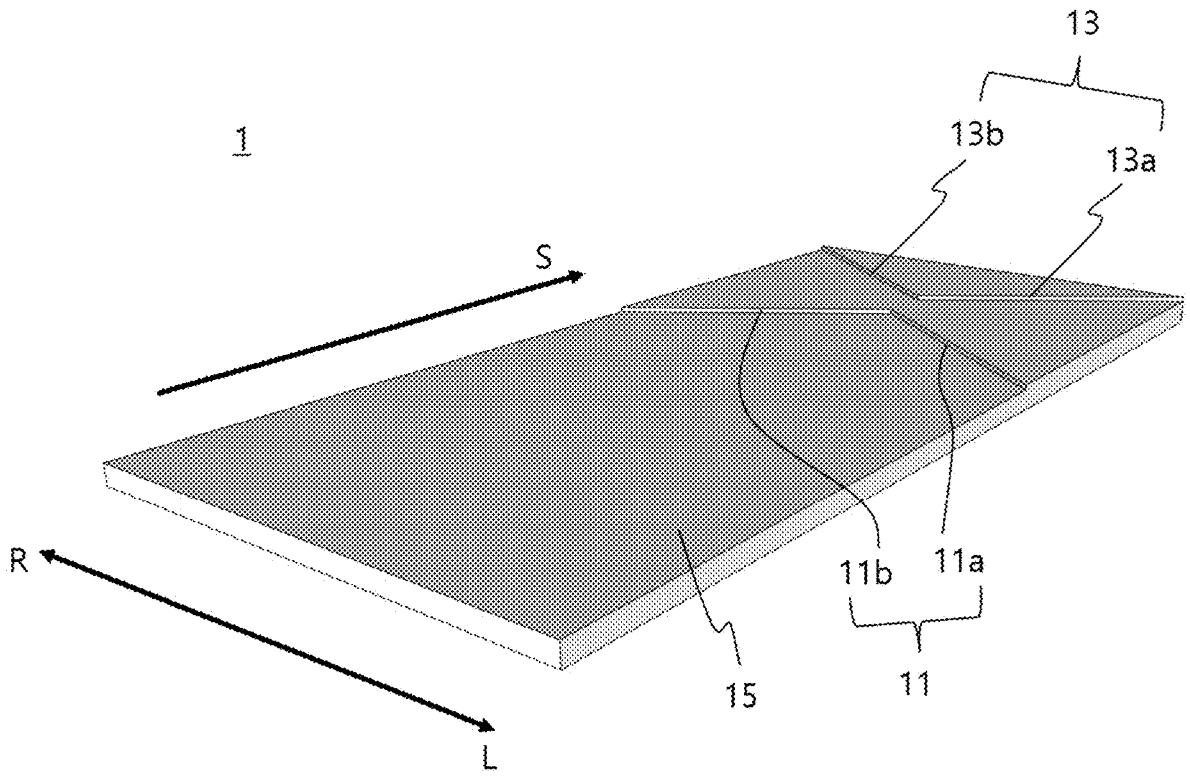
FIG. 4 is a perspective view of a roof tile of FIG. 3 illustrating a water collecting guide step and a water dispersing guide step.
Figure 5:
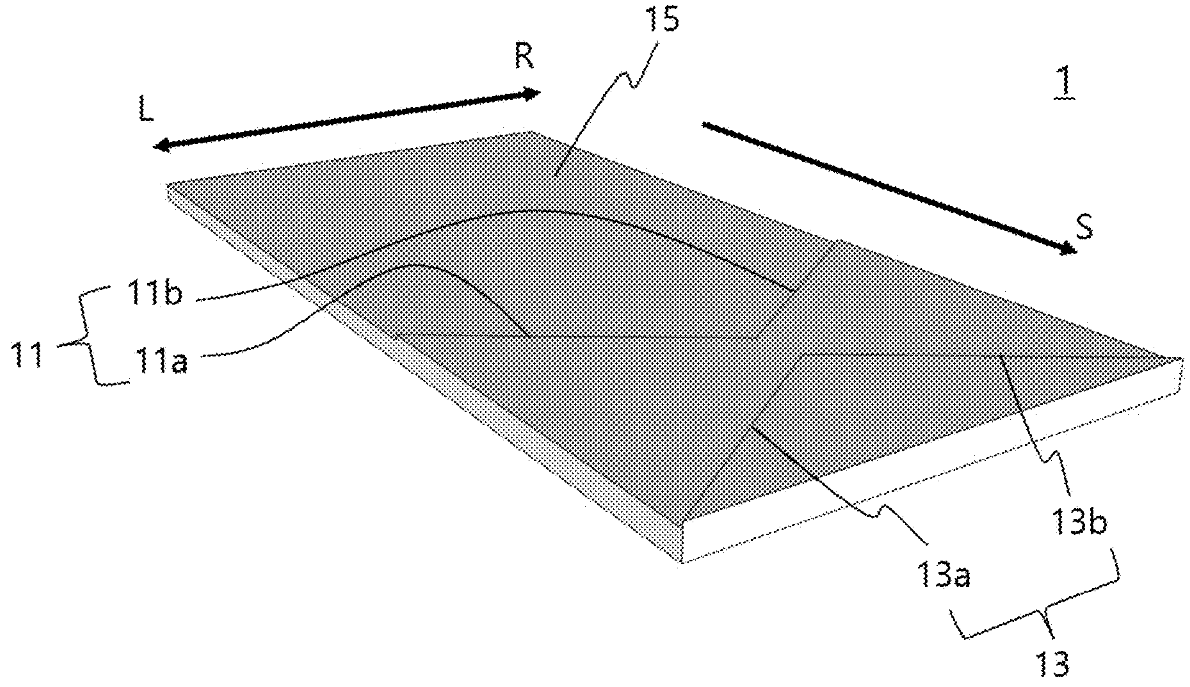
FIG. 5 is another perspective view of the roof tile of FIG. 4.
Figure 6:
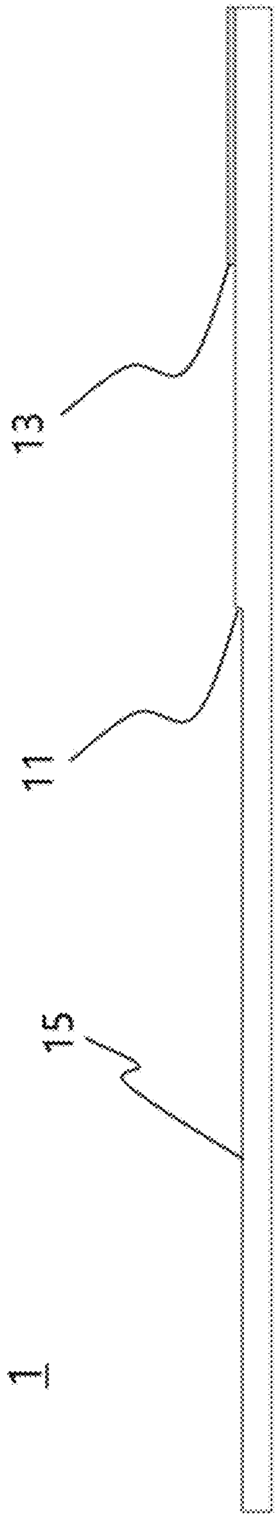
FIG. 6 is a side view of the roof tile of FIG. 4.
Figure 7:
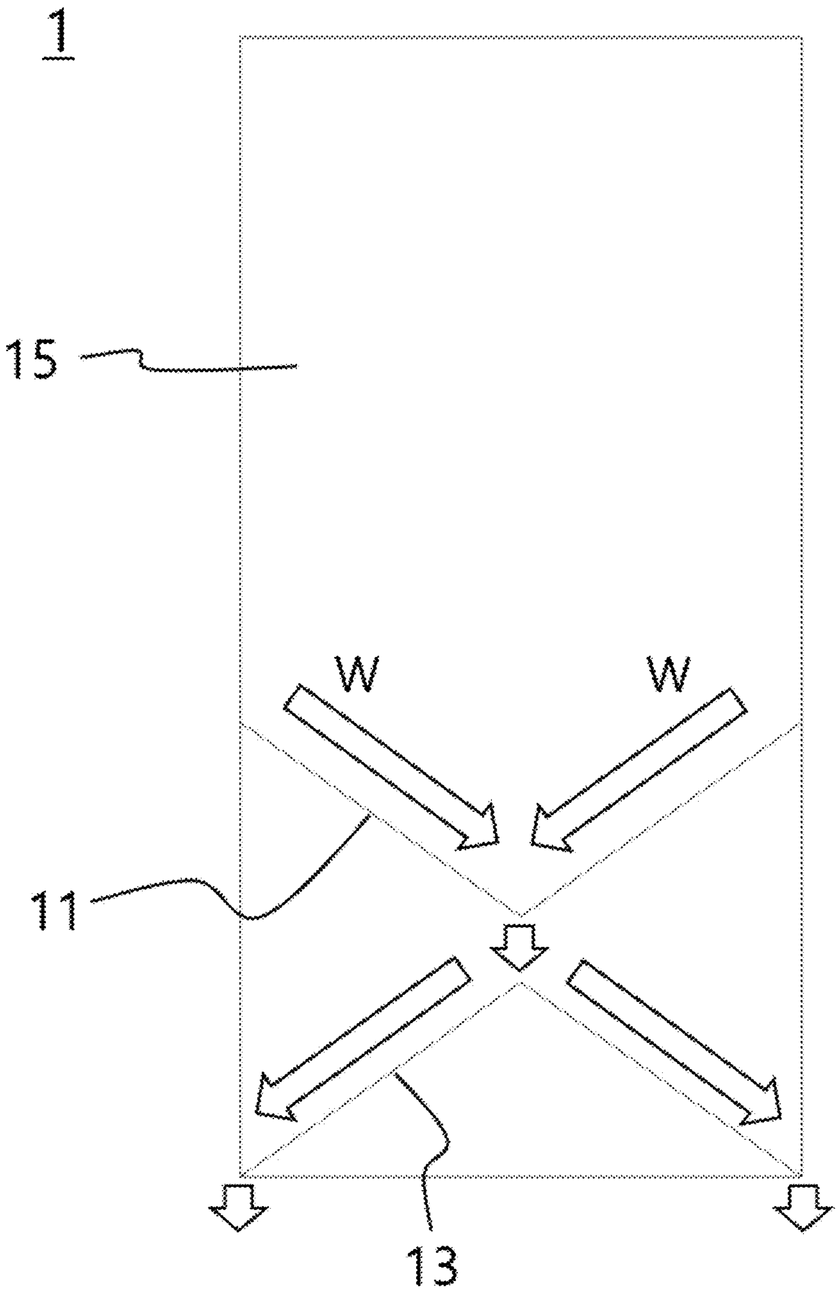
FIG. 7 is a plan view of the roof tile of FIG. 4 showing water (W) guided toward a center of the roof tile by the water collecting guide step and dispersed toward opposite side edges by the water dispersing guide step.

FIG. 4 is a perspective view of a roof tile of FIG. 3 illustrating a water collecting guide step and a water dispersing guide step. FIG. 5 is another perspective view of the roof tile of FIG. 4. FIG. 6 is a side view of the roof tile of FIG. 4. FIG. 7 is a plan view of the roof tile of FIG. 4 showing water (W) guided toward a center of the roof tile by the water collecting guide step and dispersed toward opposite side edges by the water dispersing guide step.

Referring FIGS. 4 to 7, the roof tiles 1 may be formed of ceramic, metal, or a flame-retardant synthetic resin. Each of the plurality of roof tiles 1 includes: a water collecting guide step 11 protruding to form a step configured to catch water W flowing along the slope direction S on an upper surface 115 of the roof tile 1; and a water dispersing guide step 13 spaced apart in the slope direction S from the water collecting guide step 11 and protruding to form a step configured to catch water W flowing along the slope direction S on the upper surface 115 of the roof tile 1.

The water collecting guide step 11 includes a first water collecting guide step 11*a* extending from a left end of the roof tile 1 in a direction between the slope direction S and a rightward direction R, and a second water collecting guide step 11*b* extending from a right end of the roof tile 1 in a direction between the slope direction S and a leftward direction L. The first and second water collecting guide step 11*a* and 11*b* meet each other at a center between opposite side edges of the upper surface 115 to guide water toward the center from the opposite side edges.

The water dispersing guide step 13 includes a first water dispersing guide step 13*a* extending from the left end of the roof tile 1 in a direction between a direction opposite to the slope direction S and the rightward direction R, and a second water dispersing guide step 13*b* extending from the right end of the roof tile 1 in a direction between the direction opposite to the slope direction S and the leftward direction L. The first and second water dispersing guide steps 11 and 13 meet each other at the center to guide the water W, which is collected toward the center by the water collecting guide step 11, toward the opposite side edges.

When viewed from above, the water collecting guide step 11 may have a V-shape convex in the slope direction S at a center thereof. Accordingly, water W collected toward the center by the water collecting guide step 11 can smoothly flow downward through the central portion of the convex shape of the water collecting guide step 11.

When viewed from above, the water dispersing guide step 13 may have a V-shape convex in a direction opposite to the slope direction S at a center thereof. Accordingly, the water W collected toward the center by the water collecting guide step 11 can be smoothly dispersed to both side edges by the central portion of the convex shape of the water dispersing guide step 13.

Figure 8:
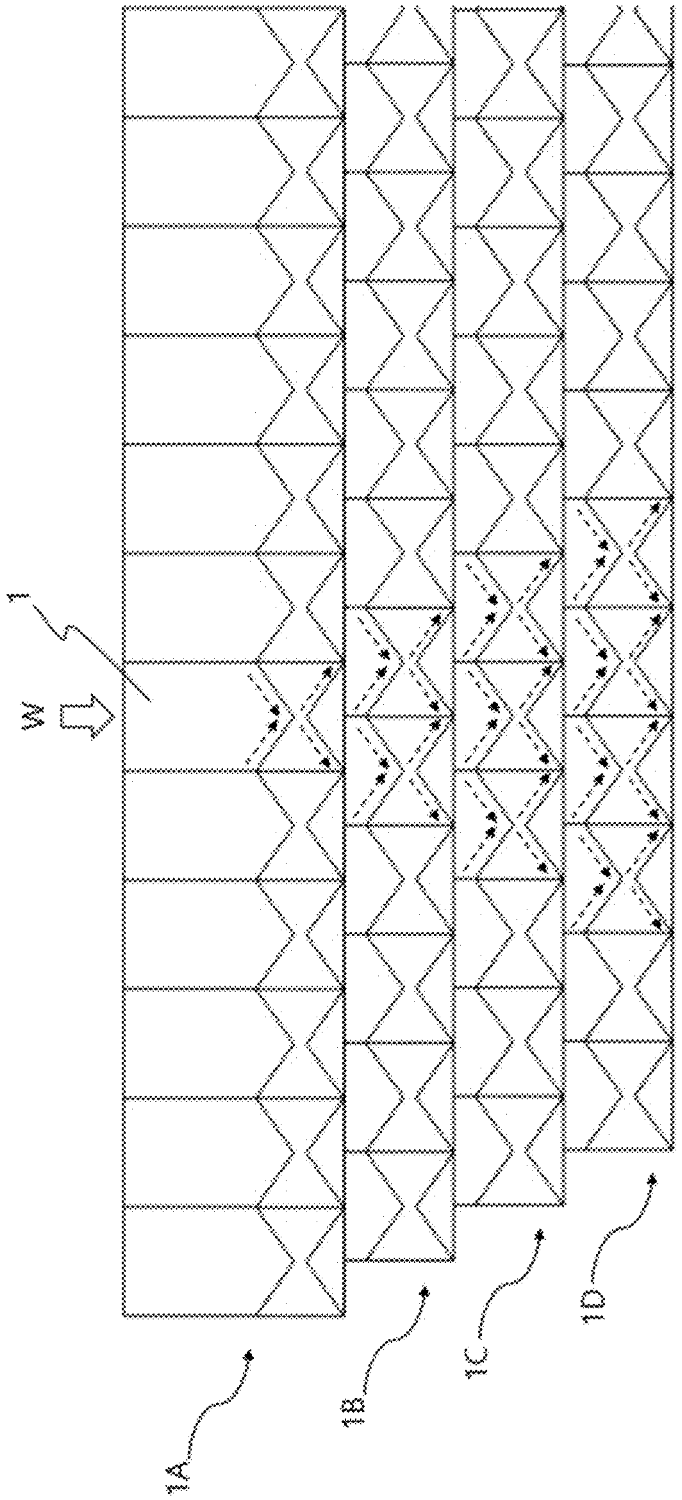
FIG. 8 is a top view of the plurality of roof tile groups of FIG. 3 illustrating water (W) flowing in the slope direction while being dispersed toward opposite side edges.

FIG. 8 is a top view of the plurality of roof tile groups of FIG. 3 illustrating water (W) flowing in the slope direction while being dispersed toward opposite side edges.

Referring FIGS. 3 and 8, the roof tile 1 overlaps with another roof tile 1 at a position spaced in a direction opposite to the slope direction S from the water collecting guide step 11, such that the water collecting guide step 11 and the water dispersing guide step 13 are exposed to the outside. Through this configuration, water W flowing along the slope direction S can be increasingly dispersed laterally as it flows downward. Specifically, water flowing along one roof tile 1 in the upper roof tile group 1A is first collected toward the center of its upper surface 115 by the water collecting guide step 11, then dispersed toward both side edges by the water dispersing guide step 13. This water W then flows into two roof tiles 1 of the lower roof tile group 1B, where it is again laterally dispersed, subsequently flowing into three roof tiles 1 of the next lower roof tile group 1C, and further dispersed into four roof tiles 1 of the next lower roof tile group 1D.

As described above, by virtue of the arrangement of the roof tile groups 1A, 1B, 1C, and 1D and the structures of the water collecting guide step 11 and the water dispersing guide step 13, even when water W initially reaches only a portion of the roof tiles 1 in an upper group, the water is progressively dispersed laterally in the slope direction S. As a result, a relatively small amount of water can sufficiently wet a wide area of roof tiles, thereby improving fire-prevention efficiency. Moreover, even if water reaches only part of the roof surface, the water is redistributed in the slope direction and spread over a larger surface area, effectively expanding the fire-protection coverage.

What is claimed is:

1. A fire-prevention building roof system, comprising:

a roof structural surface having a slope on a building roof;

at least one sprinkler installed at a ridge of the roof structural surface and configured to spray water; and a plurality of roof tiles installed to cover the roof structural surface, wherein the plurality of roof tiles comprise a plurality of roof tile groups, a plurality of the roof tiles in each of the plurality of roof tile groups being arranged in a row in a transverse direction perpendicular to a slope direction of the roof structural surface, and the plurality of roof tile groups being arranged such that the plurality of roof tile groups are partially overlapped with each other in the slope direction, wherein a portion in the slope direction of a lower surface of an upper roof tile group among two adjacent roof tile groups is in contact with a portion in a direction opposite to the slope direction of an upper surface of a lower roof tile group among the two adjacent roof tile groups, wherein, when viewed from above, boundaries between the plurality of roof tiles of the upper roof tile group are offset from boundaries between the plurality of roof tiles of the lower roof tile group, wherein each of the plurality of roof tiles comprises:

a water collecting guide step protruding to form a step configured to catch water flowing along the slope direction on an upper surface of the roof tile; and a water dispersing guide step spaced apart in the slope direction from the water collecting guide step and protruding to form a step configured to catch water flowing along the slope direction on the upper surface of the roof tile, wherein the water collecting guide step comprises a first water collecting guide step extending from a left end of the roof tile in a direction between the slope direction and a rightward direction, and a second water collecting guide step extending from a right end of the roof tile in a direction between the slope direction and a leftward direction, the first and second water collecting guide steps meeting each other at a center between opposite side edges of the upper surface to guide water toward the center from the opposite side edges, wherein the water dispersing guide step comprises a first water dispersing guide step extending from the left end of the roof tile in a direction between a direction opposite to the slope direction and the rightward direction, and a second water dispersing guide step extending from the right end of the roof tile in a direction between the direction opposite to the slope direction and the leftward direction, the first and second water dispersing guide steps meeting each other at the center to guide the water, which is collected toward the center by the water collecting guide step, toward the opposite side edges, wherein the roof tile overlaps with another roof tile at a position spaced in a direction opposite to the slope direction from the water collecting guide step, such that the water collecting guide step and the water dispersing guide step are exposed to the outside, and wherein, when viewed from above, the water collecting guide step has a V-shape convex in the slope direction at a center thereof, and the water dispersing guide step has a V-shape convex in a direction opposite to the slope direction at a center thereof.

2. The fire-prevention building roof system of claim 1, further comprising a fire detection sensor configured to detect a fire around the building, wherein the at least one sprinkler comprises a plurality of sprinklers spaced apart from each other along the ridge of the building roof, the plurality of sprinklers being operatively connected to the fire detection sensor so as to automatically spray water onto the ridge upon occurrence of a fire around the building, and wherein the roof tiles are formed of ceramic, metal, or a flame-retardant synthetic resin.

* * * * *